United States Patent
Kim et al.

(10) Patent No.: US 11,580,288 B2
(45) Date of Patent: Feb. 14, 2023

(54) INTEGRATED CIRCUIT INCLUDING STANDARD CELLS, METHOD OF MANUFACTURING THE INTEGRATED CIRCUIT, AND COMPUTING SYSTEM FOR PERFORMING THE METHOD

(71) Applicant: SAMSUNG ELECTRONICS CO., LTD., Suwon-si (KR)

(72) Inventors: Kyungbong Kim, Hwaseong-si (KR); Minsu Kim, Hwaseong-si (KR); Yonggeol Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 16/848,222

(22) Filed: Apr. 14, 2020

(65) Prior Publication Data

US 2020/0342158 A1   Oct. 29, 2020

(30) Foreign Application Priority Data

Apr. 23, 2019   (KR) .................. 10-2019-0047526
Nov. 11, 2019   (KR) .................. 10-2019-0143659

(51) Int. Cl.
*G06F 30/00*   (2020.01)
*G06F 30/398*   (2020.01)
(Continued)

(52) U.S. Cl.
CPC .......... *G06F 30/398* (2020.01); *G06F 30/327* (2020.01); *G06F 30/392* (2020.01);
(Continued)

(58) Field of Classification Search
CPC .... G06F 30/398; G06F 30/327; G06F 30/392; G06F 30/394; G06F 30/3947; G06F 30/3953; G06F 2117/04; H01L 23/5226
See application file for complete search history.

(56) References Cited

U.S. PATENT DOCUMENTS 5,696,694 A * 12/1997 Khouja .................. G06F 30/33
  716/120
6,954,909 B2 * 10/2005 Hossain ................ G06F 30/327
  716/135
(Continued)

FOREIGN PATENT DOCUMENTS

DE   102020109271 A1 * 10/2020 ........... G06F 30/327
JP   H07152812 A   * 8/1995
(Continued)

OTHER PUBLICATIONS

NOA Communication Issued Aug. 31, 2020 In Corresponding KR Application No. 10-2019-0143659.
(Continued)

*Primary Examiner* — Naum Levin
(74) *Attorney, Agent, or Firm* — F. Chau & Associates, LLC

(57) ABSTRACT

An integrated circuit includes a standard cell including a first output pin and a second output pin configured to each output the same output signal, a first routing path connected to the first output pin, and a second routing path connected to the second output pin. The first routing path includes a first cell group including at least one load cell, the second routing path includes a second cell group including at least one load cell, and the first routing path and the second routing path are electrically disconnected from each other outside the standard cell.

12 Claims, 14 Drawing Sheets

(51) Int. Cl.
    *G06F 30/392*     (2020.01)
    *G06F 30/3947*    (2020.01)
    *G06F 30/3953*    (2020.01)
    *G06F 30/327*     (2020.01)
    *H01L 23/522*     (2006.01)
    *G06F 30/394*     (2020.01)
    *G06F 117/04*     (2020.01)

(52) U.S. Cl.
    CPC ........ *G06F 30/394* (2020.01); *G06F 30/3947* (2020.01); *G06F 30/3953* (2020.01); *H01L 23/5226* (2013.01); *G06F 2117/04* (2020.01)

(56) References Cited

U.S. PATENT DOCUMENTS

| | | | |
|---|---|---|---|
| 7,921,397 B2* | 4/2011 | Yamaguchi | G06F 30/3312 |
| | | | 716/130 |
| 8,015,533 B1 | 9/2011 | Burstein et al. | |
| 8,381,162 B2 | 2/2013 | Pelloie | |
| 8,972,915 B2* | 3/2015 | Prakash | G06F 30/3312 |
| | | | 716/108 |
| 9,015,645 B1 | 4/2015 | Pampati et al. | |
| 9,024,657 B2* | 5/2015 | Andreev | H03K 19/018585 |
| | | | 326/38 |
| 9,496,174 B2 | 11/2016 | Liu et al. | |
| 9,558,312 B2 | 1/2017 | Lu et al. | |
| 9,767,240 B2* | 9/2017 | Bickford | G06F 30/30 |
| 9,859,891 B1 | 1/2018 | Kumar et al. | |
| 9,871,039 B2 | 1/2018 | Pelloie et al. | |
| 10,678,991 B2* | 6/2020 | Ku | G06F 30/394 |
| 2005/0280031 A1 | 12/2005 | Yano | |
| 2007/0157144 A1 | 7/2007 | Mai et al. | |
| 2012/0299065 A1 | 11/2012 | Shimizu | |
| 2015/0379181 A1 | 12/2015 | Macdonald et al. | |
| 2019/0102503 A1 | 4/2019 | Yang et al. | |
| 2019/0109151 A1 | 4/2019 | Kang et al. | |

FOREIGN PATENT DOCUMENTS

| | | | |
|---|---|---|---|
| JP | H0926988 A | * | 1/1997 |
| JP | 2015536562 A | * | 12/2015 |
| KR | 20170025447 A | * | 3/2017 |
| KR | 10-2018-0113137 | | 10/2018 |
| KR | 10-2018-0114812 | | 10/2018 |

OTHER PUBLICATIONS

1st OA Dated Jun. 28, 2021 In Corresponding DE Patent Application No. 102020109271.7.

* cited by examiner

INTEGRATED CIRCUIT INCLUDING STANDARD CELLS, METHOD OF MANUFACTURING THE INTEGRATED CIRCUIT, AND COMPUTING SYSTEM FOR PERFORMING THE METHOD

CROSS-REFERENCE TO RELATED APPLICATIONS

This application claims the benefit of Korean Patent Application Nos. 10-2019-0047526 filed on Apr. 23, 2019, and 10-2019-0143659 filed on Nov. 11, 2019, in the Korean Intellectual Property Office, the disclosures of which are incorporated by reference herein in their entireties.

TECHNICAL FIELD

Exemplary embodiments of the inventive concept relate to an integrated circuit, and more particularly, to an integrated circuit including standard cells, a method of manufacturing the integrated circuit, and a computing system for performing the method.

DISCUSSION OF THE RELATED ART

When an integrated circuit is manufactured, a large number of semiconductor devices may be integrated into the integrated circuit. Thus, the configuration of an integrated circuit may be complicated, and a semiconductor manufacturing process performed to manufacture the integrated circuit may be finely subdivided into a plurality of processes. When manufacturing an integrated circuit, a gate length of a device, as well as a width of wirings connecting semiconductor devices, have been progressively reduced. As a cross-sectional area of a wiring decreases, electro-migration (EM) may occur. Due to the EM, wirings may be open, or different wirings may be short-circuited with one another.

SUMMARY

Exemplary embodiments of the inventive concept provide an integrated circuit including a standard cell in which output pins are separated from one another, a method of manufacturing the integrated circuit, and a computing system for performing the method.

According to an aspect of the inventive concept, there is provided an integrated circuit including a standard cell including a first output pin and a second output pin configured to each output the same output signal, a first routing path connected to the first output pin, and a second routing path connected to the second output pin. The first routing path includes a first cell group including at least one load cell, the second routing path includes a second cell group including at least one load cell, and the first routing path and the second routing path are electrically disconnected from each other outside the standard cell.

According to another aspect of the inventive concept, there is provided a method of manufacturing an integrated circuit including a driving cell in which a first output pin and a second output pin for outputting the same output signal provided to a plurality of load cells are provided. The method includes placing the driving cell on the basis of netlist data including information about the integrated circuit with reference to a standard cell library, obtaining a level of a load allowable by each of the first output pin and the second output pin, grouping the load cells into a first cell group and a second cell group on the basis of the allowable level of the load, and connecting the first output pin to an input pin of at least one load cell of the first cell group and connecting the second output pin to an input pin of at least one load cell of the second cell group.

According to another aspect of the inventive concept, there is provided a computing system for manufacturing an integrated circuit. The computing system includes a memory configured to store a standard cell library including information about a plurality of standard cells and a program for designing the integrated circuit, and a processor configured to access the memory. The processor is configured to, by executing the program, place a driving cell including a first output pin and a second output pin each outputting the same output signal provided to load cells with reference to a standard cell library, group the load cells into a first cell group and a second cell group on the basis of a level of a load allowable by each of the first output pin and the second output pin, connect the first output pin to an input pin of at least one load cell of the first cell group, and connect the second output pin to an input pin of at least one load cell of the second cell group.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EXEMPLARY EMBODIMENTS

Figure 1A:
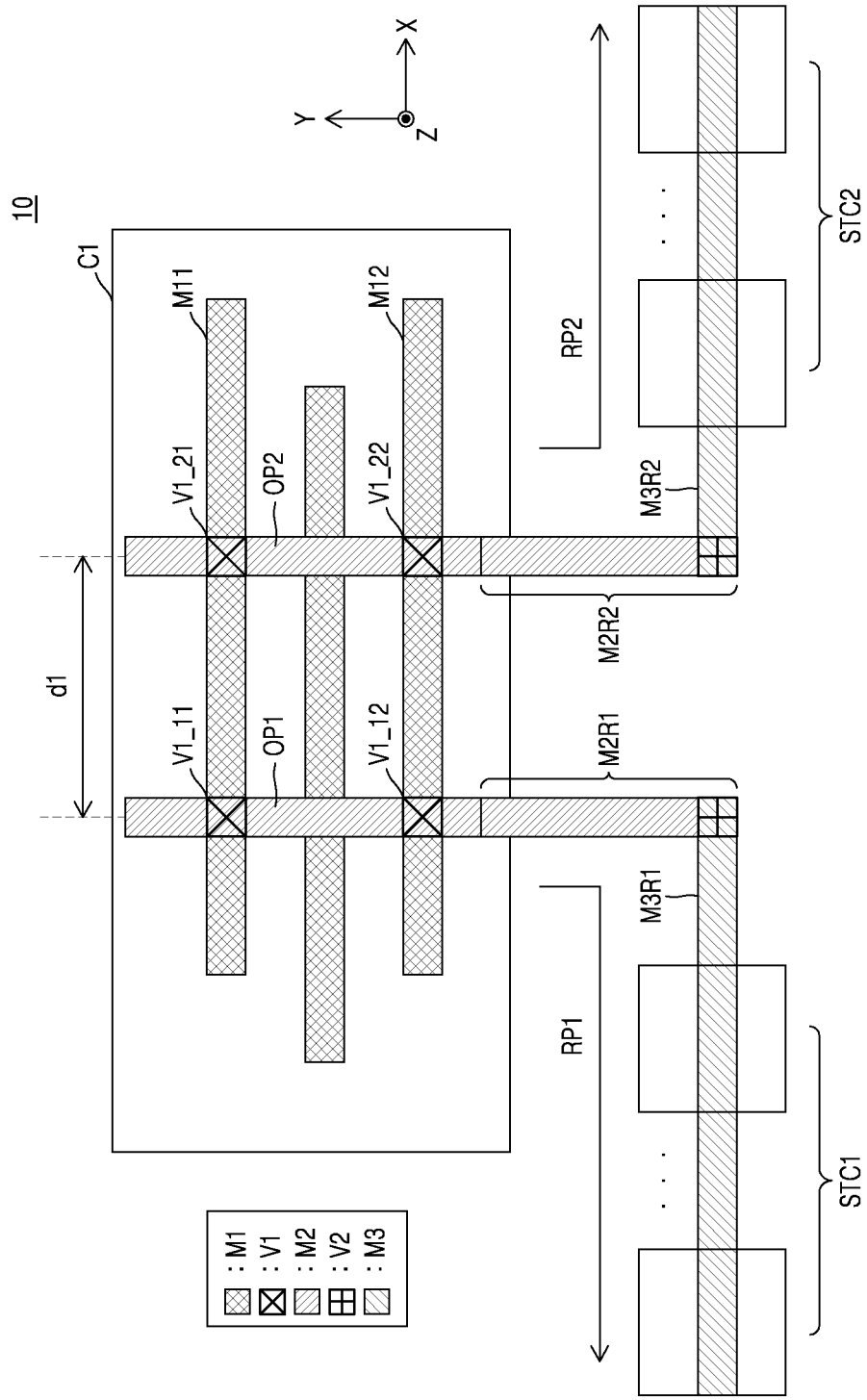
FIGS. 1A and 1B are diagrams illustrating a layout of an integrated circuit according to an exemplary embodiment.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be understood that when a component is referred to as being "connected to" another component, it can be directly connected to the other component, or intervening components may be present. It will also be understood that when a component is referred to as being "between" two components, it can be the only component between the two components, or one or more intervening components may also be present. Other words used to describe the relationship between elements should be interpreted in a like fashion.

Figure 1B:
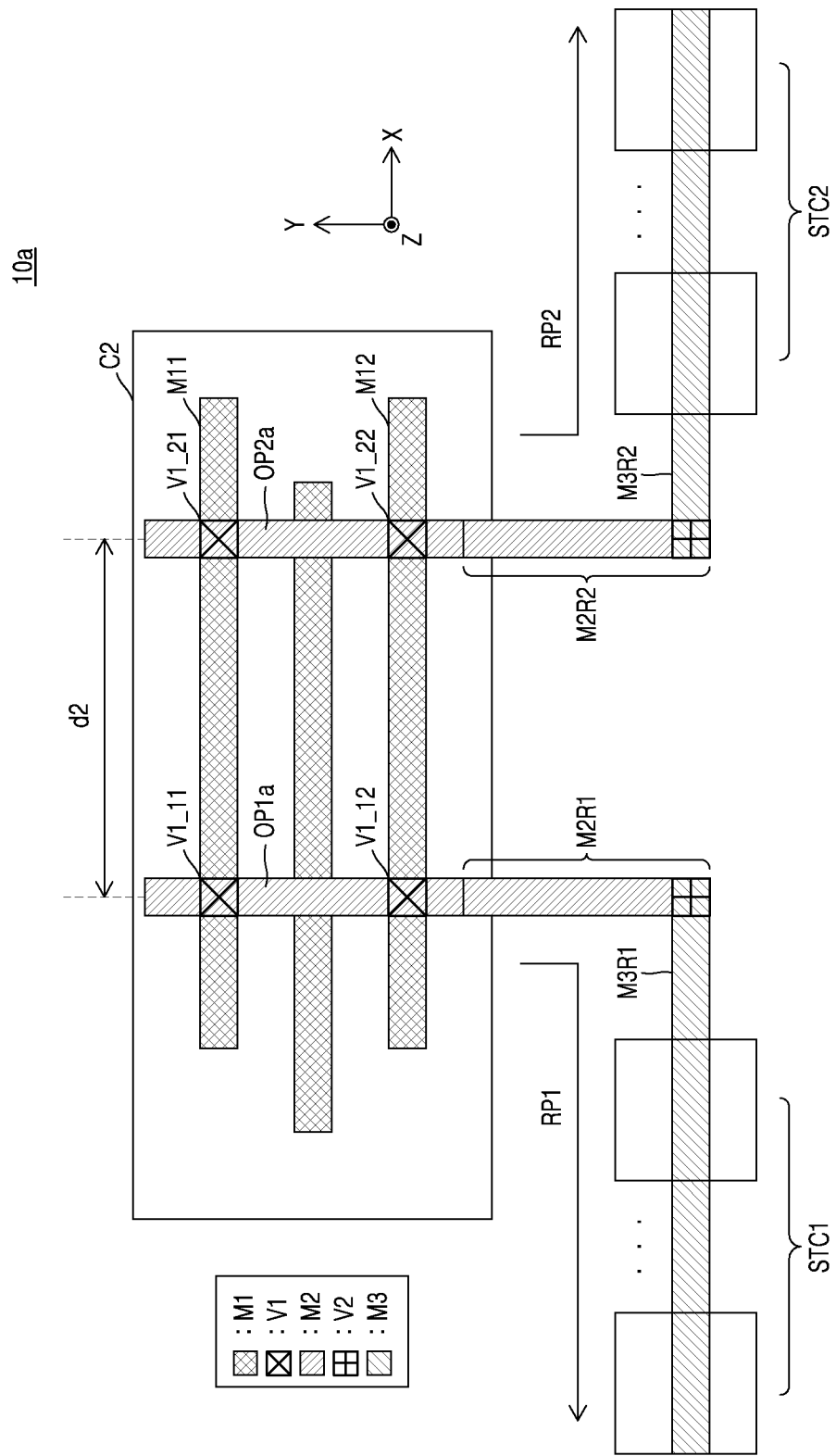

FIGS. 1A and 1B are diagrams illustrating a layout of an integrated circuit according to an exemplary embodiment.

A standard cell may be a unit of a layout included in an integrated circuit and may be referred to as a cell. A load cell may be a unit of a layout included in an integrated circuit that has a load. For example, a load cell may be a unit of a layout included in an integrated circuit that includes, for example, at least one capacitor. A load cell may correspond to, for example, a flip-flop or a latch. However, a load cell is not limited thereto. A load cell may be a type of standard cell, and may be driven by another standard cell (e.g., a driving cell) that is not a load cell. Each of standard cells C1 to C6 described below may be a driving cell. An integrated circuit may include a plurality of various cells. Cells may each have a structure based on a predefined standard and may be aligned and disposed in a plurality of rows. Herein, a first direction X may be referred to as a first horizontal direction, a second direction Y may be referred to as a second horizontal direction, and a plane based on the first direction X and the second direction Y may be referred to as a horizontal plane.

Referring to FIG. 1A, an integrated circuit 10 according to an exemplary embodiment may include at least one first standard cell C1 limited by a cell boundary. The first standard cell C1 may be provided from a standard cell library (for example, D12 of FIG. 8).

The first standard cell C1 may include an active region extending in the first direction X and may include a gate line extending in the second direction Y. The gate line and the active region may form a transistor. The first standard cell C1 may include at least one fin extending in the first direction X in the active region, and the fin may form a fin field effect transistor (FinFET) along with the gate line. The active region and the gate line may be electrically connected to a pattern of a conductive layer (for example, a first wiring layer M1) through a contact and/or a via.

In an exemplary embodiment, the active region may include a semiconductor such as, for example, silicon (Si) or germanium (Ge), or a compound semiconductor such as, for example, SiGe, SiC, GaAs, InAs, or InP, and the conductive region may include, for example, an impurity-doped well and an impurity-doped structure. In an exemplary embodiment, the gate line may include a work function metal-containing layer and a gap-fill metal layer. For example, the work function metal-containing layer may include at least one metal of titanium (Ti), tungsten (W), ruthenium (Ru), niobium (Nb), molybdenum (Mo), hafnium (Hf), nickel (Ni), cobalt (Co), platinum (Pt), ytterbium (Yb), terbium (Tb), dysprosium (Dy), erbium (Er), and palladium (Pd), and the gap-fill metal layer may include a tungsten (W) layer or an aluminum (Al) layer. In an exemplary embodiment, gate lines may include a stacked structure of TiAlC/TiN/W, a stacked structure of TiN/TaN/TiAlC/TiN/W, or a stacked structure of TiN/TaN/TiN/TiAlC/TiN/W.

The integrated circuit 10 may include a plurality of wiring layers (for example, a first wiring layer M1, a second wiring layer M2, and a third wiring layer M3), which are stacked in a third direction Z. In an exemplary embodiment, a width of a pattern provided in the third wiring layer M3 may be greater than that of a pattern provided in the second wiring layer M2, and a width of a pattern provided in the second wiring layer M2 may be greater than that of a pattern provided in the first wiring layer M1. However, the present disclosure is not limited thereto.

In an exemplary embodiment, patterns provided in the first wiring layer M1 may extend in the first direction X, patterns provided in the second wiring layer M2 may extend in the second direction Y, and patterns provided in the third wiring layer M3 may extend in the first direction X. However, the integrated circuit 10 according to the present disclosure is not limited thereto, and a direction in which each pattern extends may be variously set. The second wiring layer M2 may correspond to an upper layer with respect to the first wiring layer M1. For example, the second wiring layer M2 may be disposed above the first wiring layer M1.

The patterns provided in each of the first wiring layer M1, the second wiring layer M2, and the third wiring layer M3 may include metal, conductive metal nitride, metal silicide, or a combination thereof. For example, the patterns provided in each of the first wiring layer M1, the second wiring layer M2, and the third wiring layer M3 may include a conductive material such as W, Mo, Ti, Co, tantalum (Ta), Ni, tungsten silicide, titanium silicide, cobalt silicide, tantalum silicide, or nickel silicide.

The first standard cell C1 may include the patterns provided in the first wiring layer M1 and the patterns provided in the second wiring layer M2, and may include a first via V1 which is provided between the first wiring layer M1 and the second wiring layer M2 and which connects the first wiring layer M1 to the second wiring layer M2. However, the present disclosure is not limited thereto. For example, in exemplary embodiments, the first standard cell C1 may further include the patterns provided in the third wiring layer M3 and may include a second via V2 which is provided between the second wiring layer M2 and the third wiring layer M3 and which connects the second wiring layer M2 to the third wiring layer M3. Patterns illustrated in FIG. 1 may be some of the patterns included in the first standard cell C1. In exemplary embodiments, additional patterns may also be included in the first standard cell C1.

In an exemplary embodiment, the first standard cell C1 may include a first output pin OP1 and a second output pin OP2. The first output pin OP1 and the second output pin OP2 may be provided apart from each other on the same horizontal plane (e.g., a plane on which the second wiring layer M2 is provided). The first output pin OP1 and the second output pin OP2 may be spaced apart from each other by a first distance d1 in the first direction X.

The first output pin OP1 and the second output pin OP2 may be electrically connected to each other in the first standard cell C1. For example, the first output pin OP1 and the second output pin OP2 may be connected to each other through patterns M11 and M12 provided in the first wiring layer M1, and first vias V1_11, V1_12, V1_21, and V1_22 provided between the first wiring layer M1 and the second wiring layer M2. In the layout (for example, in a layout view), the first output pin OP1, the second output pin OP2, and the patterns M11 and M12 provided in the first wiring layer M1 may form a ring shape.

In an exemplary embodiment, the first output pin OP1 and the second output pin OP2 may be the patterns of the second wiring layer M2. However, the present disclosure is not limited thereto. For example, in exemplary embodiments, the first output pin OP1 and the second output pin OP2 may be provided on an arbitrary layer which is higher than the second wiring layer M2, and for example, may be formed as the patterns of the third wiring layer M3.

The first output pin OP1 may be connected to a first routing path RP1, and the first routing path RP1 may include a first cell group STC1. The second output pin OP2 may be connected to a second routing path RP2, and the second routing path RP2 may include a second cell group STC2.

The first standard cell C1 may be a driving cell for driving the first cell group STC1 and the second cell group STC2. The first cell group STC1 may include at least one load cell, and the second cell group STC2 may include at least one load cell. In an exemplary embodiment, the first standard cell C1 may be a power cell which provides power to the first cell group STC1 and the second cell group STC2. Alternatively, in an exemplary embodiment, the first standard cell C1 may be a clock gating cell which provides an internal clock signal to the first cell group STC1 and the second cell group STC2.

The first output pin OP1 may be connected to an input pin of the at least one load cell included in the first cell group STC1. The second output pin OP2 may be connected to an input pin of the at least one load cell included in the second cell group STC2. The first cell group STC1 may receive an output signal output from the first output pin OP1, and the second cell group STC2 may receive an output signal output from the second output pin OP2. The output signals respectively output from the first and second output pins OP1 and OP2 may be substantially the same signals. Herein, when two signals are described as being substantially the same, the two signals may be identical to each other, or if not identical, would be understood to be functionally the same as each other by a person having ordinary skill in the art.

In an exemplary embodiment, the first routing path RP1 may include a first routing wiring M2R1 provided in the second wiring layer M2, a first routing wiring M3R1 provided in the third wiring layer M3, and a second via V2 connecting the second wiring layer M2 to the third wiring layer M3. The second routing path RP2 may include a second routing wiring M2R2 provided in the second wiring layer M2, a second routing wiring M3R2 provided in the third wiring layer M3, and the second via V2. For example, the first routing path RP1 may include the first routing wiring M2R1 contacting the first output pin OP1, and the second routing path RP2 may include the second routing wiring M2R2 contacting the second output pin OP2. However, the present disclosure is not limited thereto. For example, in exemplary embodiments, a plurality of routing wirings configuring the first routing path RP1 and the second routing path RP2 may be variously provided on various wiring layers.

In an exemplary embodiment, the first routing path RP1 and the second routing path RP2 are not connected to each other outside the first standard cell C1. For example, the first routing path RP1 and the second routing path RP2 may be electrically connected to each other inside the first standard cell C1, but may be electrically disconnected from each other outside the first standard cell C1.

The first standard cell C1 included in the integrated circuit 10 according to an exemplary embodiment may include the first and second output pins OP1 and OP2 which output substantially the same signals. In this case, the first routing path RP1 connected to the first output pin OP1 and the second routing path RP2 connected to the second output pin OP2 may be disconnected from each other, and thus, an output load of each of the first and second output pins OP1 and OP2 may be reduced. Therefore, a current density of a current flowing through each of the first and second output pins OP1 and OP2 may be reduced, and thus, the occurrence of electro-migration (EM) may be prevented or reduced. In the integrated circuit 10 according to an exemplary embodiment, although an additional wiring is not provided in the third wiring layer M3, a defect in which wirings are short-circuited with each other or are open in the integrated circuit 10 due to EM may be reduced.

Referring to FIG. 1B, an integrated circuit 10a according to an exemplary embodiment may include at least one second standard cell C2. The second standard cell C2 may include a first output pin OP1a and a second output pin OP2a, which output substantially the same signals.

The first output pin OP1a and the second output pin OP2a may be patterns provided in the second wiring layer M2 and may be spaced apart from each other by a second distance d2 in a first direction X. In an exemplary embodiment, the second distance d2 by which the first output pin OP1a and the second output pin OP2a of the second standard cell C2 are spaced apart from each other may be greater than the first distance d1 by which the first output pin OP1 and the second output pin OP2 of the first standard cell C1 of FIG. 1A are spaced apart from each other. When the same load cells are connected to the first standard cell C1 of FIG. 1A and the second standard cell C2 of FIG. 1B, a current density of each of the first output pin OP1a and the second output pin OP2a of the second standard cell C2 may be lower than that of each of the first output pin OP1 and the second output pin OP2 of the first standard cell C1. Therefore, in comparison with the first standard cell C1 of FIG. 1A, a probability that EM occurs may be lowered in the second standard cell C2 of FIG. 1B.

A standard cell library D12 (for example, FIG. 8) of a computing system for designing the integrated circuits 10 and 10a according to an exemplary embodiment may store information about the first standard cell C1 of FIG. 1A and information about the second standard cell C2 of FIG. 1B. As described below with reference to FIG. 8, in a process of manufacturing an integrated circuit, the standard cell library D12 may provide standard cells which provide the same function (e.g., the same function of a driving cell) and have different structures, and a standard cell having a suitable structure may be selected from the standard cell library D12 in a process of placing the standard cells. For example, in the integrated circuits 10 and 10a, one of the first standard cell C1 of FIG. 1A and the second standard cell C2 of FIG. 1B may be selectively placed based on a load level of each of the first cell group STC1 and the second cell group STC2. Therefore, each of the integrated circuits 10 and 10a may include standard cells which provide the same function and performance and have different structures.

Figure 2:
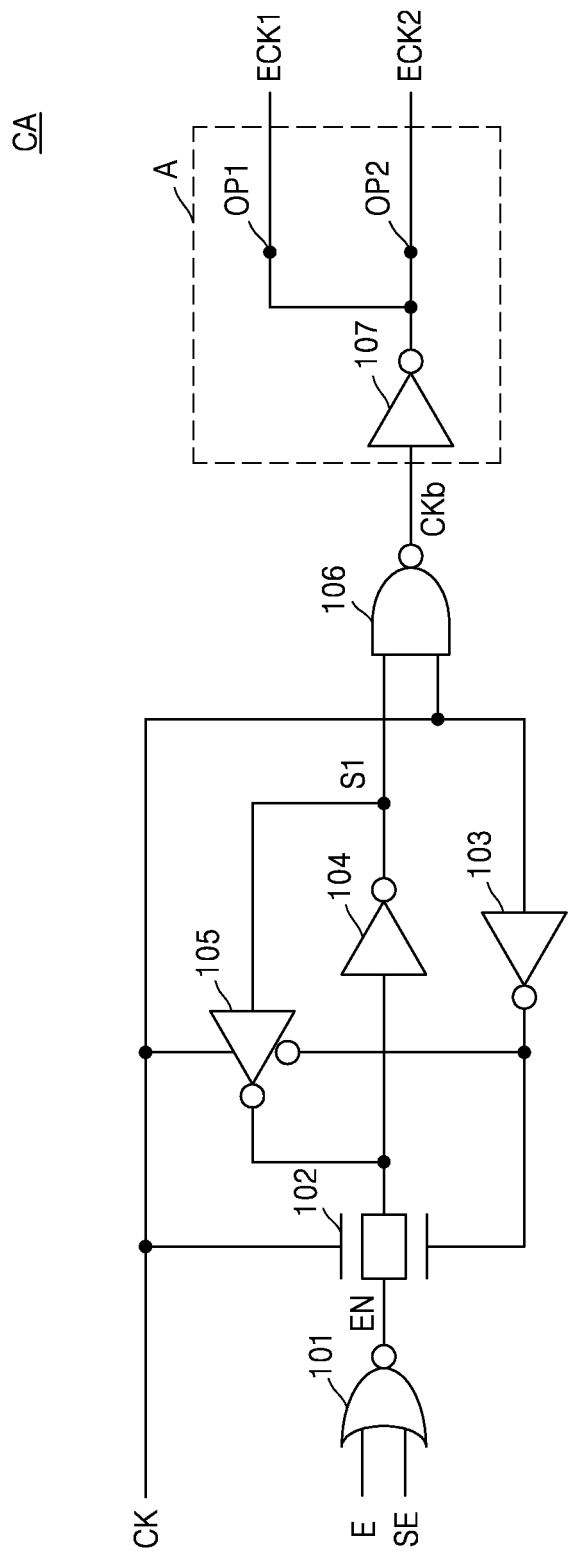
FIG. 2 is a circuit diagram in which a standard cell included in an integrated circuit according to an exemplary embodiment is a clock gating cell.

FIG. 2 is a circuit diagram in which a standard cell included in an integrated circuit according to an exemplary embodiment is a clock gating cell. A region A of FIG. 2 may correspond to the layout of each of the first standard cell C1 of FIG. 1A and the second standard cell C2 of FIG. 1B.

In FIG. 2, a circuit of each of elements of the first and second standard cells C1 and C2 corresponding to a clock gating cell CA is illustrated in detail. However, the present disclosure is not limited to the configuration illustrated in FIG. 2. For example, in exemplary embodiments, a circuit of each of elements of the clock gating cell CA may be modified. Also, for convenience of description, to describe the layout of each of the first standard cell C1 of FIG. 1A and the second standard cell C2 of FIG. 1B, the clock gating cell CA will be described with reference to FIG. 2. However, the present disclosure is not limited thereto, and the following description may be applied to another driving cell for driving a plurality of load cells.

Referring to FIG. 2, the clock gating cell CA may include a NOR gate 101, a transmission gate 102, a plurality of inverters 103 and 104, a three-phase inverter 105, a NAND gate 106, and an output inverter 107.

The NOR gate 101 may receive an enable signal E and a scan enable signal SE, and may generate an inverted enable signal. The transmission gate 102, the inverter 104, and the three-phase inverter 105 may configure a latch. The transmission gate 102 may receive the inverted enable signal EN and may transfer the inverted enable signal EN to the inverter 104 on the basis of a clock signal CK. The inverter 104 may invert the inverted enable signal EN and may transfer a first signal S1 to the NAND gate 106. The three-phase inverter 105 may receive the first signal S1 and may output a signal generated by inverting the first signal S1 on the basis of the clock signal CK.

The NAND gate 106 may receive the first signal S1 and the clock signal CK, and may generate an inverted clock signal CKb. The output inverter 107 may invert the inverted clock signal CKb to output a first output signal ECK1 and a second output signal ECK2. In this case, the first output signal ECK1 and the second output signal ECK2 may each be an internal clock signal provided to load cells connected to the clock gating cell CA.

The first output signal ECK1 may be output from the first output pin OP1 (or OP1a) connected to an output terminal of the output inverter 107, and the second output signal ECK2 may be output from the second output pin OP2 (or OP2a) connected to an output terminal of the output inverter 107. The first output signal ECK1 and the second output signal ECK2 may be signals output from different output pins or may be signals output from the same node (e.g., an output terminal of the output inverter 107), and thus, may be substantially the same signals.

In the clock gating cell CA included in the integrated circuit 10 according to an exemplary embodiment, an output pin, which outputs substantially the same signal, may be divided into the first output pin OP1 (or OP1a) and the second output pin OP2 (or OP2a), and the first output signal ECK1 and the second output signal ECK2 may be provided to different load cells, thereby decreasing an output load of each of the first output pin OP1 (or OP1a) and the second output pin OP2 (or OP2a) of the clock gating cell CA.

Figure 3:
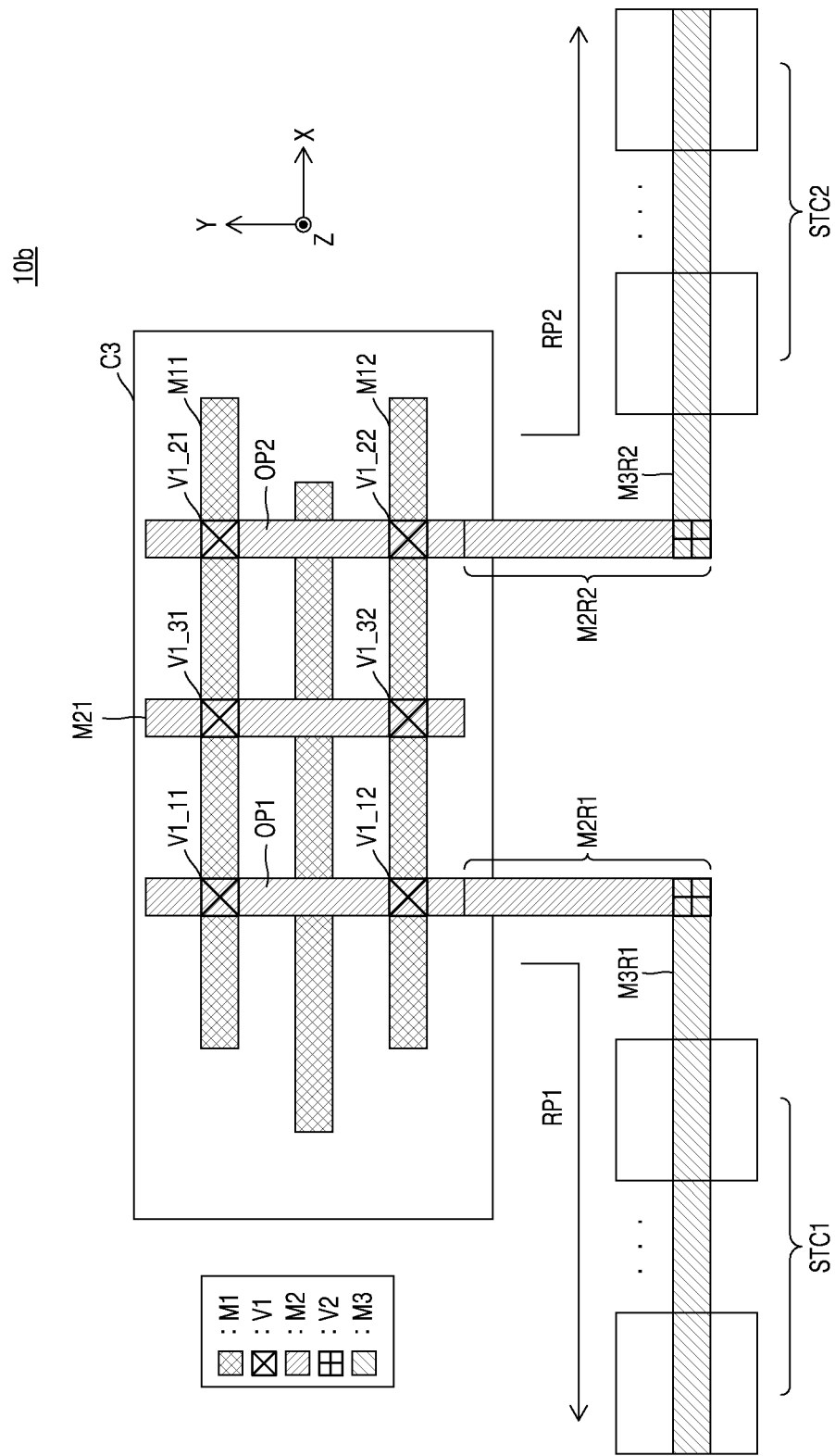
FIG. 3 is a diagram illustrating a layout of an integrated circuit according to an exemplary embodiment.

FIG. 3 is a diagram illustrating a layout of an integrated circuit 10b according to an exemplary embodiment. Hereinafter, for convenience of explanation, a further description of elements and aspects previously described may be omitted.

Referring to FIG. 3, the integrated circuit 10b according to an exemplary embodiment may include at least one third standard cell C3. The third standard cell C3 may include a first output pin OP1 and a second output pin OP2.

The first output pin OP1 and the second output pin OP2 may be electrically connected to each other in the first standard cell C1. For example, the first output pin OP1 and the second output pin OP2 may be connected to each other through patterns M11 and M12 provided in a first wiring layer M1, first vias V1_11, V1_12, V1_21, V1_22, V1_31, and V1_32 provided between the first wiring layer M1 and a second wiring layer M2, and a pattern M21 provided in the second wiring layer M2. The pattern M21 provided in the second wiring layer M2 may be connected to the patterns M11 and M12 provided in the first wiring layer M1 through the first vias V1_31 and V1_32. In the layout (for example, in a layout view), the first output pin OP1, the second output pin OP2, the patterns M11 and M12 provided in the first wiring layer M1, and the pattern M21 provided in the second wiring layer M2 may form a mesh structure.

The first output pin OP1 may be connected to a first routing path RP1, and the second output pin OP2 may be connected to a second routing path RP2. A first cell group STC1 may receive an output signal output from the first output pin OP1, and a second cell group STC2 may receive an output signal output from the second output pin OP2. The output signals respectively output from the first and second output pins OP1 and OP2 may be substantially the same signals. In an exemplary embodiment, the first routing path RP1 and the second routing path RP2 are not connected to each other outside the third standard cell C3. For example, the first routing path RP1 and the second routing path RP2 may be electrically connected to each other in the third standard cell C3, but may be electrically disconnected from each other outside the third standard cell C3.

Figure 4:
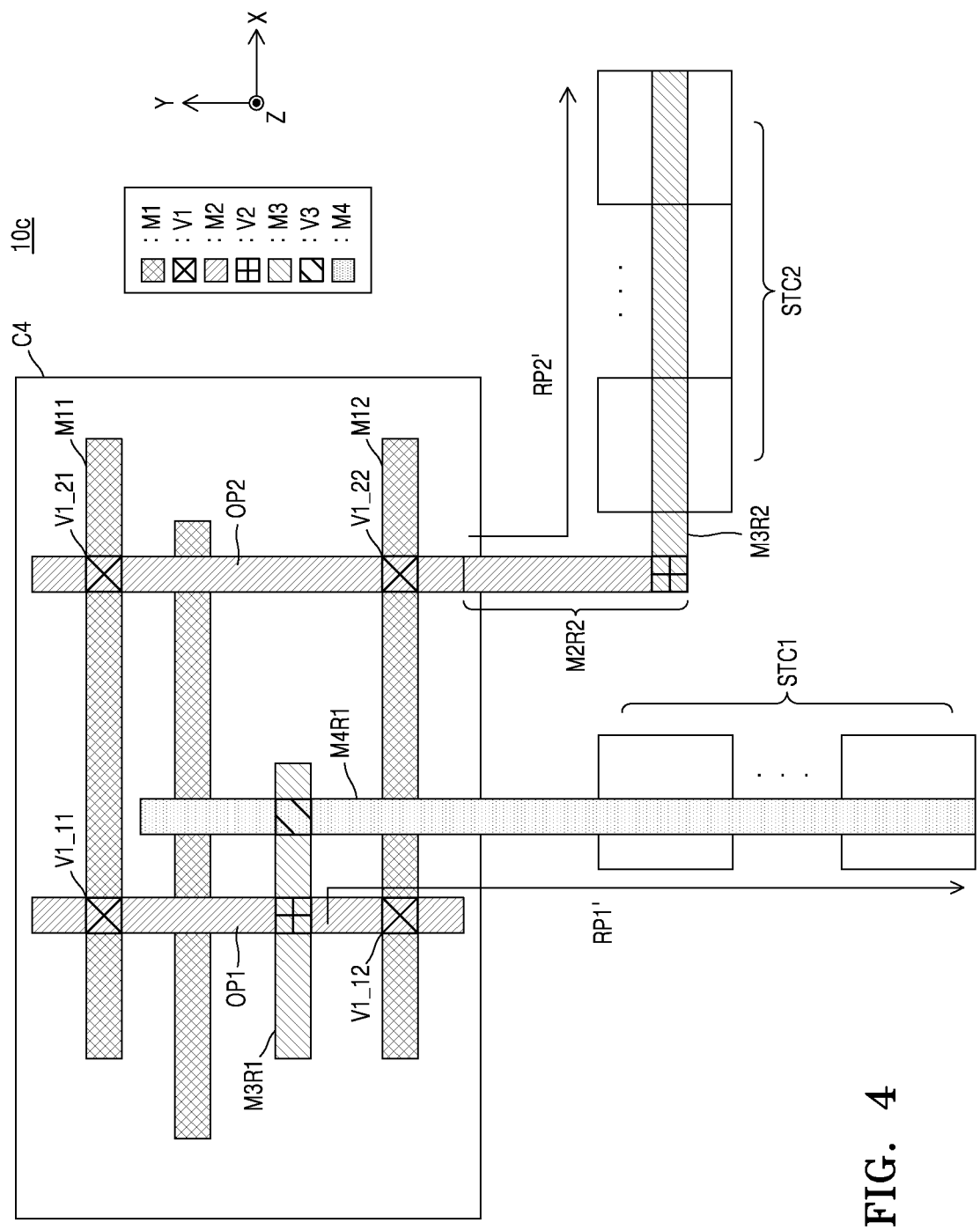
FIG. 4 is a diagram illustrating a layout of an integrated circuit according to an exemplary embodiment.

FIG. 4 is a diagram illustrating a layout of an integrated circuit 10c according to an exemplary embodiment. Hereinafter, for convenience of explanation, a further description of elements and aspects previously described may be omitted.

Referring to FIG. 4, the integrated circuit 10c according to an exemplary embodiment may include a fourth standard cell C4 and first and second cell groups STC1 and STC2 connected to the fourth standard cell C4. Each of the first cell group STC1 and the second cell group STC2 may include at least one load cell.

The integrated circuit 10c may include a plurality of wiring layers (for example, first to fourth wiring layers M1 to M4), which are stacked in a third direction Z. In an exemplary embodiment, a width of a pattern provided in the fourth wiring layer M4 may be greater than that of a pattern provided in the third wiring layer M3, and patterns provided in the fourth wiring layer M4 may extend in a second direction Y. However, the present disclosure is not limited thereto. For example, in exemplary embodiments, a direction and a width in which each pattern extends in and by may be variously set.

A first output pin OP1 may be connected to a first routing path RP1', and the first routing path RP1' may include the first cell group STC1. A second output pin OP2 may be connected to a second routing path RP2', and the second routing path RP2' may include the second cell group STC2.

In an exemplary embodiment, the first routing path RP1' may include a first routing wiring M3R1 of the third wiring layer M3, a first routing wiring M4R1 of the fourth wiring layer M4, a second via V2 connecting the first output pin OP1 to the third wiring layer M3, and a third via V3 connecting the third wiring layer M3 to the fourth wiring layer M4. The third wiring layer M3 may correspond to an upper layer with respect to the second wiring layer M2. For example, the third wiring layer M3 be disposed above the second wiring layer M2. The second routing path RP2' may include a second routing wiring M2R2 of the second wiring layer M2, a second routing wiring M3R2 of the third wiring layer M3, and the second via V2 connecting the second wiring layer M2 to the third wiring layer M3. For example, the first routing path RP1' may include the first routing wiring M3R1 of the third wiring layer M3 and the second via V2 contacting the first output pin OP1 and the first routing wiring M3R1, and the second routing path RP2' may include the second routing wiring M2R2 of the second wiring layer M2 contacting the second output pin OP2. However, the present disclosure is not limited thereto. For example, in exemplary embodiments, the second routing path RP2' may include the second via V2, which is connected to the pattern of the third wiring layer M3 and contacts the second output pin OP2. A plurality of routing wirings configuring the first routing path RP1' and the second routing path RP2' may be variously provided on various wiring layers.

In an exemplary embodiment, the first routing path RP1' and the second routing path RP2' are not connected to each other outside the fourth standard cell C4. For example, the first routing path RP1' and the second routing path RP2' may be electrically connected to each other in the fourth standard cell C4, but may be electrically disconnected from each other outside the fourth standard cell C4.

In the integrated circuit 10c according to an exemplary embodiment, the first output pin OP1 may be connected to the first routing wiring M3R1 provided in the third wiring layer M3 through the second via V2, and thus, the fourth standard cell C4, which is a driving cell, may be connected to the first cell group STC1 including at least one load cell. In the first to fourth wiring layers M1 to M4, a degree of freedom in forming a pattern may increase toward an upper level, and it may be possible to form a pattern having a relatively wide width. Therefore, based on a load level of the first routing path RP1', a width of a pattern forming at least one first routing wiring of the first routing wiring M3R1 provided in the third wiring layer M3 and the first routing wiring M4R1 provided in the fourth wiring layer M4 may be adjusted, or the number of patterns forming the at least one first routing wiring may be adjusted.

The fourth standard cell C4 included in the integrated circuit 10c according to an exemplary embodiment may include a plurality of output pins (e.g., the first output pin OP1 and the second output pin OP2), and the first routing path RP1' connected to the first output pin OP1 may be provided apart from the second routing path RP2' connected to the second output pin OP2, thereby decreasing an output load of each of the first output pin OP1 and the second output pin OP2.

Figure 5:
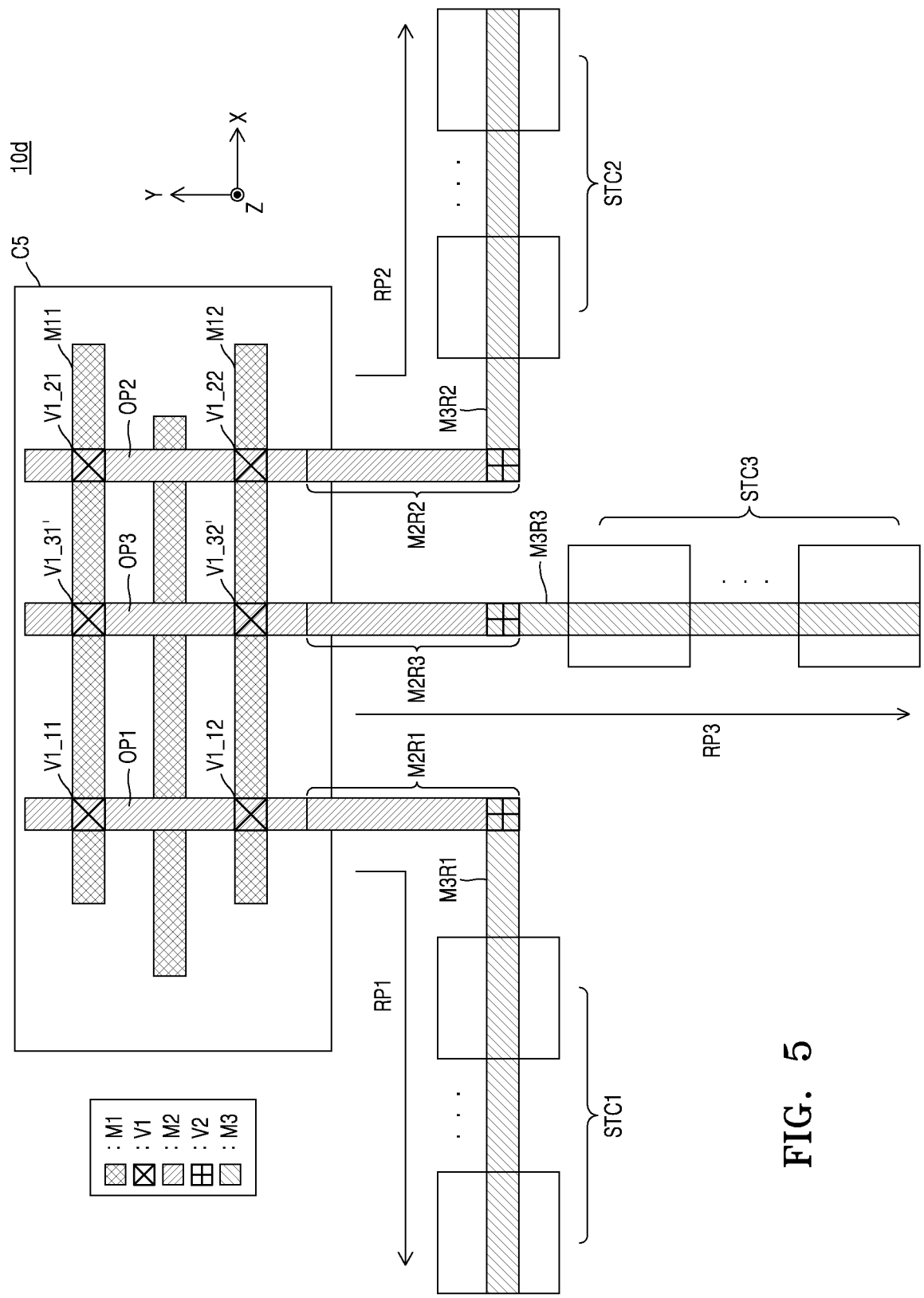
FIG. 5 is a diagram illustrating a layout of an integrated circuit according to an exemplary embodiment.

FIG. 5 is a diagram illustrating a layout of an integrated circuit 10d according to an exemplary embodiment. Hereinafter, for convenience of explanation, a further description of elements and aspects previously described may be omitted.

Referring to FIG. 5, the integrated circuit 10d according to an exemplary embodiment may include at least one fifth standard cell C5. The fifth standard cell C5 may include a plurality of output pins OP1 to OP3, and for example, may include a first output pin OP1, a second output pin OP2, and a third output pin OP3.

The first to third output pins OP1 to OP3 may be electrically connected to one another in the fifth standard cell C5. For example, the first to third output pins OP1 to OP3 may be connected to one another through patterns M11 and M12 provided in a first wiring layer M1, first vias V1_11, V1_12, V1_21, V1_22, V1_31', and V1_32' provided between the first wiring layer M1 and a second wiring layer M2.

The third output pin OP3 may be connected to a third routing path RP3, and the third routing path RP3 may include a third cell group STC3. The third cell group STC3 may include at least one standard cell which is a load cell. In an exemplary embodiment, the third routing path RP3 may include a third routing wiring M2R3 of the second wiring layer M2, a third routing wiring M3R3 of the third wiring layer M3, and a second via V2 connecting the second wiring layer M2 to the third wiring layer M3.

The third cell group STC3 may receive an output signal output from the third output pin OP3. Output signals respectively output from the first to third output pins OP1 to OP3 may be substantially the same signals.

In an exemplary embodiment, the first to third routing paths RP1 to RP3 are not connected to one another outside the fifth standard cell C5. For example, the first to third routing paths RP1 to RP3 may be electrically connected to one another in the fifth standard cell C5, but may be electrically disconnected from one another outside the fifth standard cell C5.

The fifth standard cell C5 of FIG. 5 may include three output pins which output substantially the same output signals. However, the present disclosure is not limited thereto. For example, in exemplary embodiments, the fifth standard cell C5, which is a driving cell, may include a various number of output pins which output substantially the same output signals. In a case in which load cells connected to the fifth standard cell C5, which is a driving cell, are the same, as the number of output pins outputting substantially the same signals increases, a load level of each of the output pins may decrease and a current density of each output pin may be reduced. On the other hand, as the number of output pins outputting substantially the same signals decreases, it may become easier to form a routing path connected to load cells. Therefore, in integrated circuits, the number of pins which are included in one fifth standard cell C5 and output substantially the same output signals may be variously adjusted based on a desired design characteristic.

Figure 6:
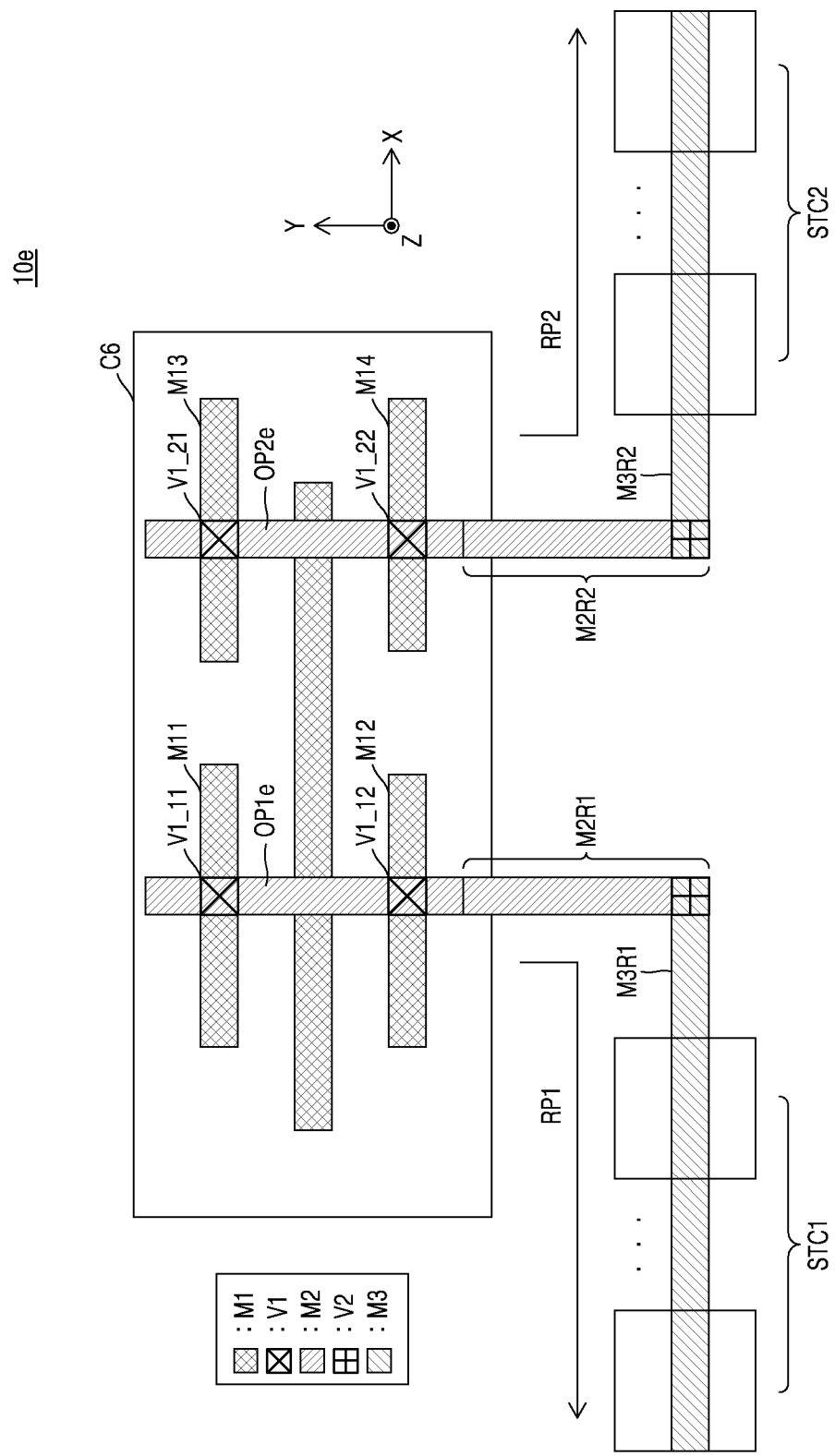
FIG. 6 is a diagram illustrating a layout of an integrated circuit according to an exemplary embodiment.

FIG. 6 is a diagram illustrating a layout of an integrated circuit 10e according to an exemplary embodiment. Hereinafter, for convenience of explanation, a further description of elements and aspects previously described may be omitted.

Referring to FIG. 6, the integrated circuit 10e according to an exemplary embodiment may include at least one sixth standard cell C6 limited by a cell boundary. The sixth standard cell C6 may include patterns provided in a first wiring layer M1 and patterns provided in a second wiring layer M2. However, the present disclosure is not limited thereto. For example, in exemplary embodiments, the sixth standard cell C6 may further include patterns provided in a third wiring layer M3.

In an exemplary embodiment, the sixth standard cell C6 may include a first output pin OP1e and a second output pin OP2e. In FIG. 6, the sixth standard cell C6 is illustrated as including two output pins, the first output pin OP1e and the second output pin OP2e. However, the present disclosure is not limited thereto. For example, in exemplary embodiments, the number of output pins provided in the sixth standard cell C6 may be three or more.

In an exemplary embodiment, the first output pin OP1e and the second output pin OP2e of the sixth standard cell C6 may be connected to different elements. For example, the first output pin OP1e may be connected to a first inverter, and the second output pin OP2e may be connected to a second inverter. The first inverter and the second inverter may receive one signal and may respectively output an output signal to the first output pin OP1e and the second output pin OP2e.

The first output pin OP1e may be connected to a first routing path RP1, and the second output pin OP2e may be connected to a second routing path RP2. A first cell group STC1 may receive a first output signal output from the first output pin OP1e, and a second cell group STC2 may receive a second output signal output from the second output pin OP2e. In an exemplary embodiment, the first output pin OP1e and the second output pin OP2e may be provided physically apart from each other, and the first output signal and the second output signal respectively output from the first output pin OP1e and the second output pin OP2e may be substantially the same signals. However, one signal may be output from the first output pin OP1e and the second output pin OP2e, which branch from one end of a buffer or an inverter and are connected to the other end of the buffer or the inverter, and thus, a timing characteristic of each of the first output signal and the second output signal may vary.

In an exemplary embodiment, each of the first output pin OP1e and the second output pin OP2e may be provided to have a pattern of the second wiring layer M2 of the sixth standard cell C6. The first output pin OP1e may be connected to patterns M11 and M12 of the first wiring layer M1 through first vias V1_11 and V1_12 provided between the first wiring layer M1 and the second wiring layer M2. The second output pin OP2e may be connected to patterns M13 and M14 of the first wiring layer M1 through first vias V1_21 and V1_22 provided between the first wiring layer M1 and the second wiring layer M2.

In an exemplary embodiment, the first output pin OP1e and the second output pin OP2e may be provided apart from each other on the same horizontal plane (e.g., a plane on which the second wiring layer M2 is provided). The patterns M11 and M12 of the first wiring layer M1, which are connected to the first output pin OP1e and are disposed under the first output pin OP1e, and the patterns M13 and M14 of the first wiring layer M1, which are connected to the second output pin OP2e and are disposed under the second output pin OP2e, may be provided apart from each other on the same horizontal plane (e.g., a plane on which the first wiring layer M1 is provided). Therefore, a characteristic of the first output signal output from the first output pin OP1e may differ from that of the second output signal output from the second output pin OP2e.

The sixth standard cell C6 included in the integrated circuit 10e according to an exemplary embodiment may include a plurality of output pins (e.g., the first output pin OP1e and the second output pin OP2e). The first routing path RP1 connected to the first output pin OP1e may be provided apart from the second routing path RP2 connected to the second output pin OP2e, thereby decreasing an output load of each of the first output pin OP1e and the second output pin OP2e.

Figure 7:
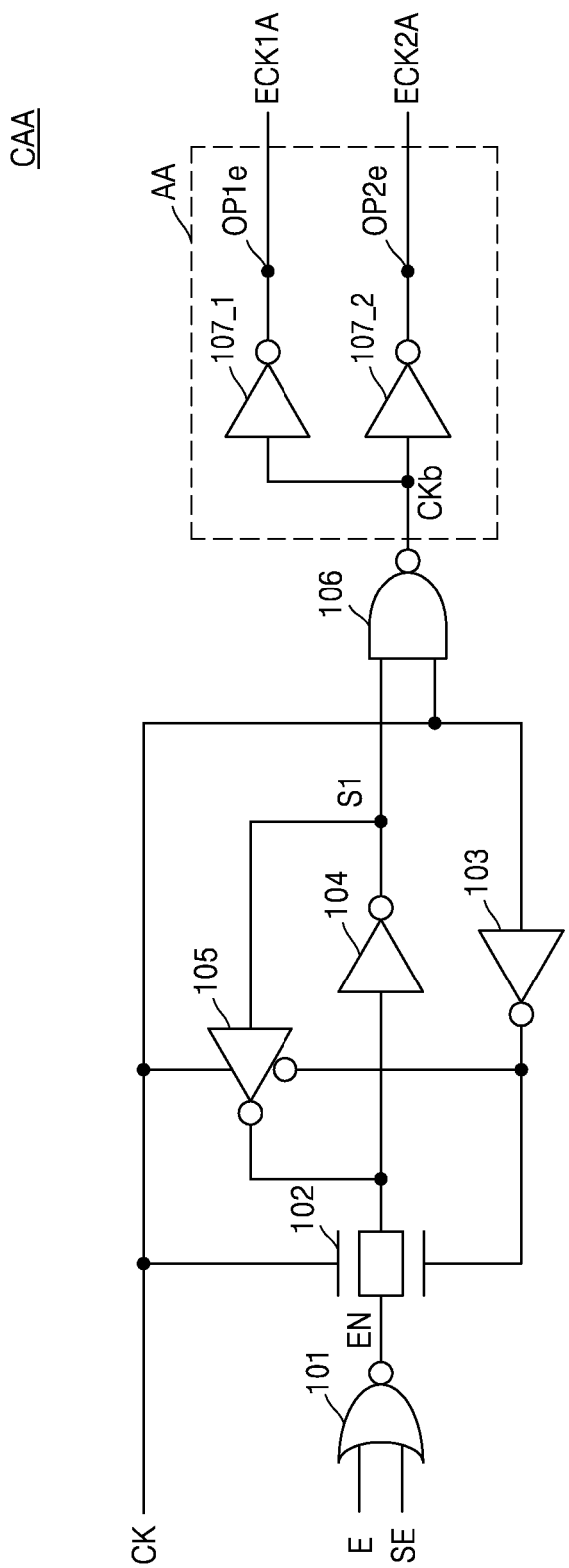
FIG. 7 is a circuit diagram in which a standard cell included in an integrated circuit according to an exemplary embodiment is a clock gating cell.

FIG. 7 is a circuit diagram in which a standard cell included in an integrated circuit according to an exemplary embodiment is a clock gating cell. A region AA of FIG. 7 may correspond to a layout of the sixth standard cell C6 illustrated in FIG. 6. Hereinafter, for convenience of explanation, a further description of elements and aspects previously described may be omitted.

In FIG. 7, a circuit of each element of a sixth standard cell C6, which is a clock gating cell CAA, is illustrated. However, the present disclosure is not limited to the configuration illustrated in FIG. 7. For example, in exemplary embodiments, a circuit of each of elements of the clock gating cell CAA may be modified.

Referring to FIG. 7, the clock gating cell CAA may include a NOR gate 101, a transmission gate 102, a plurality of inverters 103 and 104, a three-phase inverter 105, a NAND gate 106, a first output inverter 107_1, and a second output inverter 107_2.

The first output inverter 107_1 may receive an inverted clock signal CKb from the NAND gate 106, and may invert the inverted clock signal CKb to output a first output signal ECK1A. The second output inverter 107_2 may receive the inverted clock signal CKb from the NAND gate 106 and may invert the inverted clock signal CKb to output a second output signal ECK2A.

The first output signal ECK1A may be output from a first output pin OP1e connected to an output terminal of the first output inverter 107_1, and the second output signal ECK2A may be output from a second output pin OP2e connected to an output terminal of the second output inverter 107_2. For example, the first output signal ECK1A and the second output signal ECK2A may be signals output through output terminals of the first output inverter 107_1 and the second output inverter 107_2 which receive the inverted clock signal CKb, which is one signal that is input to the first output inverter 107_1 and the second output inverter 107_2. The first output signal ECK1A and the second output signal ECK2A may be output via the first output inverter 107_1 and the second output inverter 107_2, which are different output inverters, and thus, may be substantially the same signals, although there may be a difference between characteristics such as timing characteristics thereof.

For example, the timing characteristics of the first output signal ECK1A and the second output signal ECK2A may differ. Therefore, in a method of manufacturing an integrated circuit according to an exemplary embodiment, a first cell group connected to the first output pin OP1e of the clock gating cell CAA and a second cell group connected to the second output pin OP2e of the clock gating cell CAA may be selected based on the characteristic of each of the first output signal ECK1A and the second output signal ECK2A.

Figure 8:
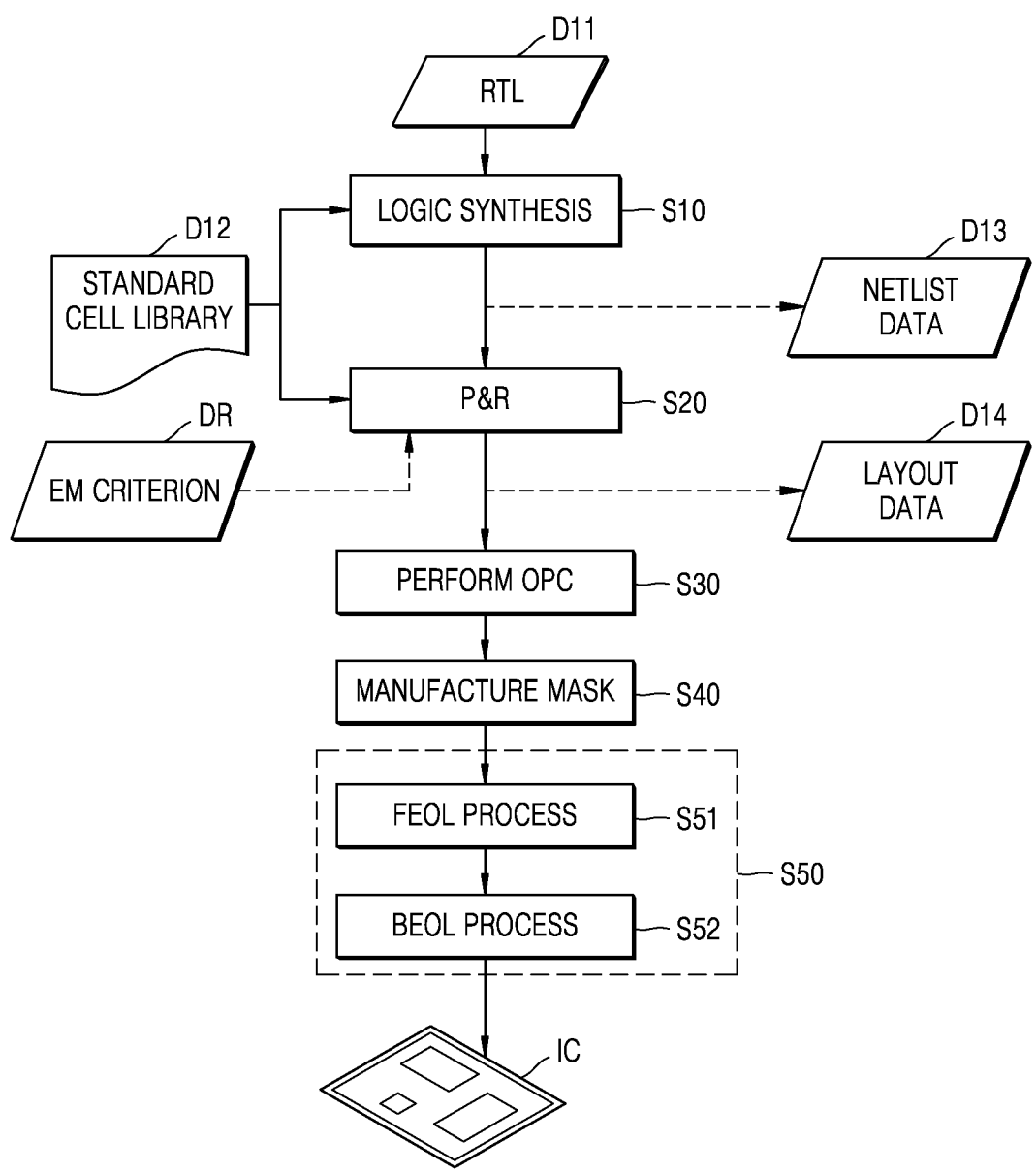
FIG. 8 is a flowchart illustrating a method of manufacturing an integrated circuit according to an exemplary embodiment.
Figure 9:
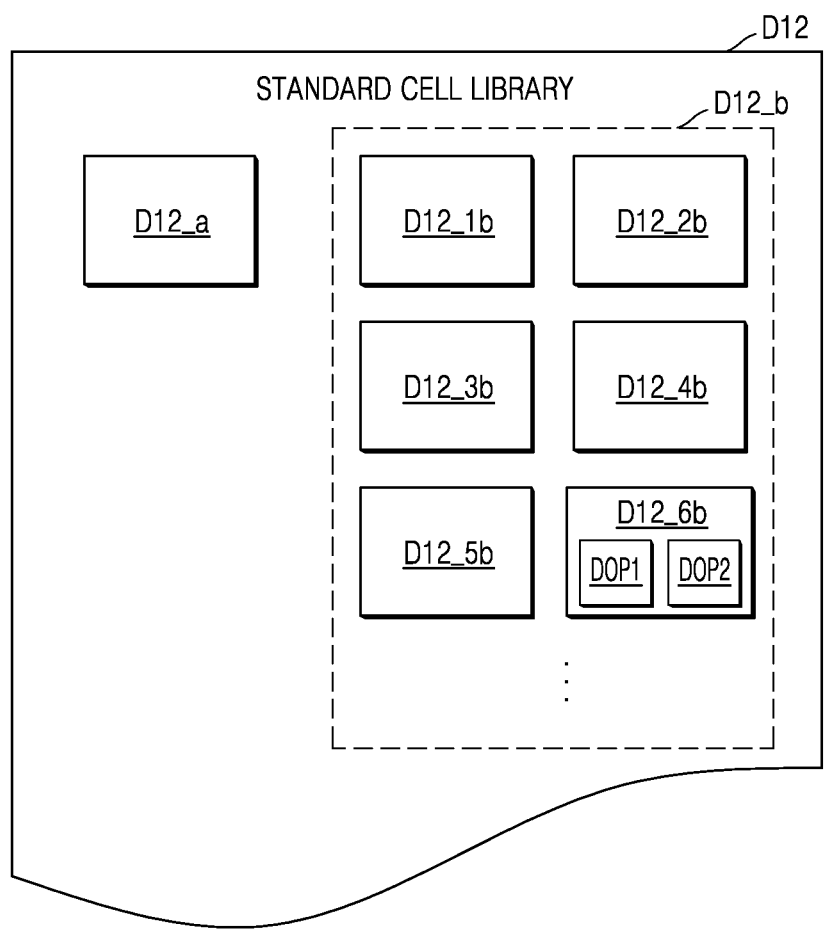
FIG. 9 is a diagram for describing a standard cell library referenced in a method of manufacturing an integrated circuit according to an exemplary embodiment.

FIG. 8 is a flowchart illustrating a method of manufacturing an integrated circuit according to an exemplary embodiment. FIG. 9 is a diagram for describing a standard cell library referenced in a method of manufacturing an integrated circuit according to an exemplary embodiment.

Referring to FIGS. 8 and 9, a method of manufacturing an integrated circuit IC may refer to a process design kit (PDK). The PDK may include a standard cell library D12 and a design rule.

The standard cell library D12 may include information (for example, function information, characteristic information, and layout information) about standard cells. As illustrated in FIG. 9, the standard cell library D12 may include pieces of data D12_a and D12_b defining a layout of a standard cell.

In an exemplary embodiment, the standard cell library D12 may define a layout of each of the standard cells (for example, C1 to C6 of FIGS. 1A to 6), which provide the same function and performance. For example, first data D12_a may define a standard cell including one output pin which outputs a certain output signal. Second to seventh data D12_1b to D12_6b may define a standard cell including a plurality of output pins which output certain output signals. The second data D12_1b may define the first standard cell C1 of FIG. 1A. The third data D12_2b may define the second standard cell C2 of FIG. 1B. The fourth data D12_3b may define the third standard cell C3 of FIG. 3. The fifth data D12_4b may define the fourth standard cell C4 of FIG. 4. The sixth data D12_5b may define the fifth standard cell C5 of FIG. 5. The seventh data D12_6b may define the sixth standard cell C6 of FIG. 6.

As described above with reference to FIGS. 6 and 7, the seventh data D12_6b may include information DOP1 about the first output signal output from the first output pin OP1e of the sixth standard cell C6 of FIG. 6 and information DOP2 about the second output signal output from the second output pin OP2e of the sixth standard cell C6 of FIG. 6. For example, the seventh data D12_6b may include a timing characteristic of the first output signal and a timing characteristic of the second output signal.

In an exemplary embodiment, an EM criterion DR may be defined. For example, the EM criterion DR may include a reference value of a load level based on load cells connected to an output pin of a standard cell which is a driving cell. In an exemplary embodiment, the EM criterion DR may be received from a designer and may be stored in a memory, or may be a criterion defined in the design rule.

In operation S10, a logic synthesis operation of generating netlist data D13 from RTL data D11 may be performed. For example, a semiconductor design tool (for example, a logic synthesis tool) may perform logic synthesis with reference to the standard cell library D12 from the RTL data D11 written in a hardware description language (HDL) such as, for example, Verilog and VHSIC hardware description language (VHDL), thereby generating the netlist data D13 including a netlist or a bitstream.

In operation S20, a place and routing (P&R) operation of generating layout data D14 from the netlist data D13 with reference to the standard cell library D12 may be performed. Also, in operation S20, the place and routing operation of generating the layout data D14 from the netlist data D13 on the basis of an obtained EM criterion DR may be performed. In the place and routing operation S20, an operation of placing standard cells, generating interconnections, and generating the layout data D14 may be performed. An example of operation S20 will be described below with reference to FIGS. 10 to 12.

For example, the semiconductor design tool (for example, a P&R tool) may place a plurality of standard cells with reference to the standard cell library D12 from the netlist data D13. For example, the semiconductor design tool may select one layout from among layouts of a standard cell defined based on the netlist data D13, and may place the selected layout of the standard cell with reference to the data D12_a and D12_b. For example, a driving cell may be placed based on the netlist data D13 including information about the integrated circuit IC with reference to the standard cell library D12.

An interconnection may electrically connect an output pin and an input pin of the standard cell, and for example, may include at least one via and at least one routing wiring. The layout data D14 may have, for example, a format such as GDSII and may include geometrical information about interconnections and standard cells.

In operation S30, optical proximity correction (OPC) may be performed. The OPC may denote an operation of forming a pattern having a desired shape by correcting distortion such as refraction caused by a characteristic of light in photolithography included in a semiconductor process of manufacturing the integrated circuit IC. A pattern of a mask may be determined by applying the OPC to the layout data D14. In exemplary embodiments, a layout of the integrated circuit IC may be restrictively modified in operation S30. A process of restrictively modifying the integrated circuit IC in operation S30 may be a post-processing process of optimizing a structure of the integrated circuit IC and may be referred to as a design polishing process.

In operation S40, an operation of manufacturing a mask may be performed. For example, by applying the OPC to the layout data D14, patterns of a mask may be defined for forming patterns provided in a plurality of layers, and at least one mask (or a photomask) for forming patterns of the plurality of layers may be manufactured.

In operation S50, an operation of manufacturing the integrated circuit IC may be performed. For example, a plurality of layers may be patterned by using the at least one mask, which is manufactured in operation S40, and thus, the integrated circuit IC may be manufactured. In an exemplary embodiment, operation S50 may include operations S51 and S52.

In operation S51, a front-end-of-line (FEOL) process may be performed. The FEOL process may denote a process of forming individual elements (for example, a transistor, a capacitor, a resistor, etc.) on a substrate in a manufacturing process. For example, the FEOL process may include an operation of planarizing and cleaning a wafer, an operation of forming a trench, an operation of forming a well, an operation of forming a gate line, and an operation of forming a source and a drain.

In operation S52, a back-end-of-line (BEOL) process may be performed. The BEOL process may denote a process of connecting the individual elements (for example, the transistor, the capacitor, the resistor, etc.) in the manufacturing process. For example, the BEOL process may include an operation of silicidating a gate region, a source region, and a drain region, an operation of adding a dielectric, a planarization operation, an operation of forming a hole, an operation of adding a metal layer, an operation of forming a via, and an operation of forming a passivation layer. Subsequently, the integrated circuit IC may be packaged into a semiconductor package and may be used as parts of various applications.

Figure 10:
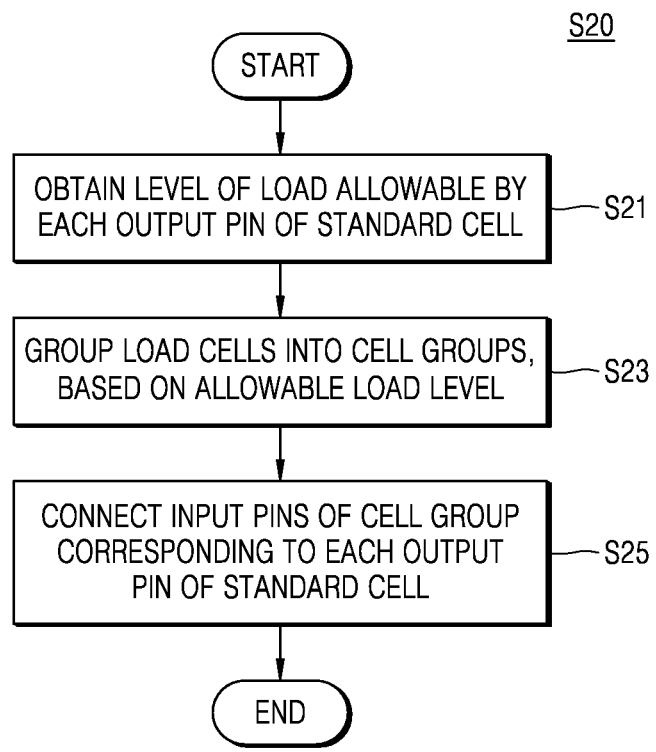
FIG. 10 is a flowchart illustrating an example of operation S20 of FIG. 8 according to an exemplary embodiment.

FIG. 10 is a flowchart illustrating an example of operation S20 of FIG. 8 according to an exemplary embodiment. Operation S20 may include operations S21 to S25.

Referring to FIG. 10, a level of a load allowable by each of a plurality of output pins of a standard cell, which is an operation cell (or a driving cell) for operating a plurality of load cells, may be obtained in operation S21. In an exemplary embodiment, a level of a load allowable by each of a plurality of output pins may be pre-designated in the design rule, or may be information input from a designer. Alternatively, an allowable level of a load may be calculated based on a characteristic of an integrated circuit.

For example, referring to FIG. 1A, a first level of a load allowable by the first output pin OP1 and a second level of a load allowable by the second output pin OP2 may be obtained. In this case, the first level may be the same as the second level. Alternatively, for example, referring to FIG. 6, a first level of a load allowable by the first output pin OP1e and a second level of a load allowable by the second output pin OP2e may be obtained. In this case, the first level may differ from the second level. However, the present disclosure is not limited thereto. For example, in exemplary embodiments, the first level of a load allowable by the first output pin OP1e may be the same as the second level of a load allowable by the second output pin OP2e.

In operation S23, load cells may be grouped into a plurality of cell groups (for example, a first cell group and a second cell group) on the basis of an allowable level of a load. For example, referring to FIG. 1A, load cells may be divided into the first cell group STC1 and the second cell group STC2 on the basis of the first level and the second level. For example, load cells may be divided into the first cell group STC1 and the second cell group STC2 so as not to exceed the first level and the second level.

In operation S25, a plurality of output pins of a standard cell may be respectively connected to input pins of load cells. For example, an input pin of at least one load cell included in the first cell group STC1 may be connected to the first output pin OP1, and an input pin of at least one load cell included in the second cell group STC2 may be connected to the second output pin OP2.

Figure 11:
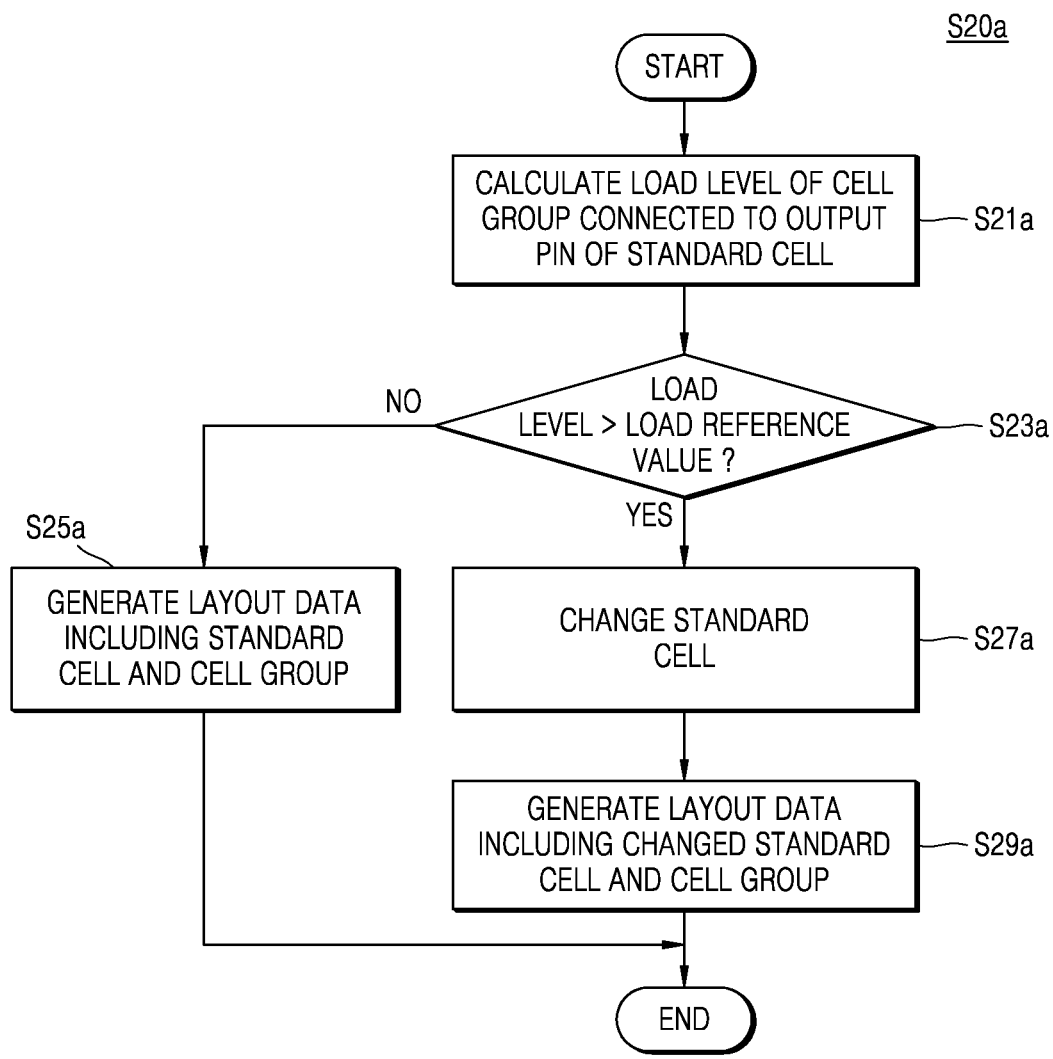
FIG. 11 is a flowchart illustrating an example of operation S20 of FIG. 8 according to an exemplary embodiment.

FIG. 11 is a flowchart illustrating an example of operation S20 of FIG. 8 according to an exemplary embodiment. Operation S20a may include operations S21a to S29a and may be a simulation operation of checking whether the integrated circuit satisfies an EM criterion. In an exemplary embodiment, operation S20a may be performed after operation S25 of FIG. 10.

Referring to FIG. 11, in operation S21a, a load level of a cell group connected to each of a plurality of output pins of a standard cell, which is a driving cell for operating a plurality of load cells, may be calculated. For example, referring to FIG. 1A, a level of a load of the first cell group STC1 connected to the first output pin OP1 may be calculated, and a level of a load of the second cell group STC2 connected to the second output pin OP2 may be calculated. In an exemplary embodiment, a level of a load of a routing path connected to each of a plurality of output pins may be calculated in operation S21a. A level of a load of the first routing path RP1 may be calculated based on the level of the load of the first cell group STC1, and a level of a load of the second routing path RP2 may be calculated based on the level of the load of the second cell group STC2.

In operation S23a, the calculated level of the load may be compared with a reference value of a load. The reference value of the load may be determined based on an EM criterion of the design rule and may be a predesignated value. When the calculated level of the load is about equal to or less than the reference value of a load, layout data (for example, D14 of FIG. 8) including a standard cell and a cell group connected to the standard cell may be generated in operation S25a.

When the calculated level of the load is greater than the reference value of a load, the standard cell may be changed to another standard cell for providing the same function and performance in operation S27a. For example, the standard cell may be changed from the first standard cell C1 of FIG. 1A to the second standard cell C2 of FIG. 1B on the basis of the second data D12_1b and the third data D12_2b of the standard cell library D12 of FIG. 9. Alternatively, for example, the standard cell may be changed from the first standard cell C1 of FIG. 1A to the third standard cell C3 of FIG. 3 on the basis of the second data D12_1b and the fourth data D12_3b of the standard cell library D12.

Alternatively, for example, the standard cell may be changed from the first standard cell C1 of FIG. 1A to the fifth standard cell C5 of FIG. 5 on the basis of the second data D12_1b and the fifth data D12_4b of the standard cell library D12. Therefore, load cells connected to the first standard cell C1 of FIG. 1A may be grouped into the first to third cell groups STC1 to STC3 and may be connected to the first to third output pins OP1 to OP3.

Alternatively, for example, in a case in which the standard cell of operation S21a is a cell which outputs a certain output signal to one output pin, the standard cell may be changed from the standard cell of operation S21a to the first standard cell C1 of FIG. 1A on the basis of the first data D12_a and the second data D12_1b of the standard cell library D12. Therefore, load cells connected to the standard cell of operation S21a may be grouped into the first and second cell groups STC1 and STC2 and may be connected to the first and second output pins OP1 and OP2.

In operation S29a, layout data D14 including a changed standard cell and a cell group connected to the changed standard cell may be generated. For example, the generated layout data D14 may include the changed standard cell, the first cell group STC1, and the second cell group STC2. Therefore, in the method of manufacturing the integrated circuit according to an exemplary embodiment, an output load of an output pin of a standard cell which is a driving cell does not exceed the reference value.

Figure 12:
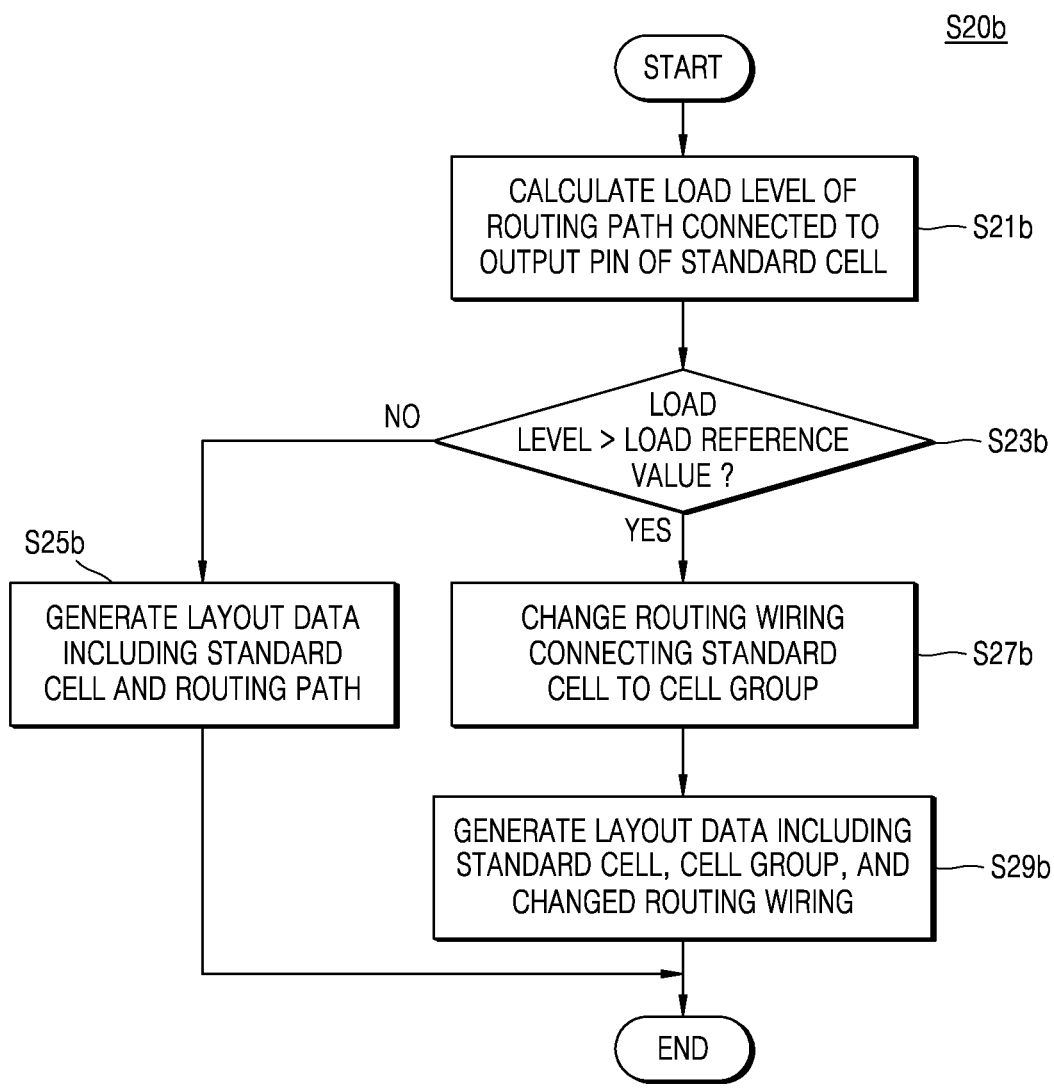
FIG. 12 is a flowchart illustrating an example of operation S20 of FIG. 8 according to an exemplary embodiment.

FIG. 12 is a flowchart illustrating an example of operation S20 of FIG. 8 according to an exemplary embodiment. Operation S20b may include operations S21b to S29b and may be a simulation operation of checking whether the integrated circuit satisfies the EM criterion. In an exemplary embodiment, operation S20b may be performed after operation S25 of FIG. 10.

Referring to FIG. 12, in operation S21b, a load level of a routing path connected to each of a plurality of output pins of a standard cell, which is a driving cell for operating a plurality of load cells, may be calculated. For example, referring to FIG. 1A, a level of a load of the first routing path RP1 connected to the first output pin OP1 may be calculated, and a level of a load of the second routing path RP2 connected to the second output pin OP2 may be calculated. In an exemplary embodiment, a level of a load of the first routing path RP1 may be calculated based on the level of the load of the first cell group STC1, and a level of a load of the second routing path RP2 may be calculated based on the level of the load of the second cell group STC2.

In operation S23b, the calculated level of the load may be compared with a reference value of a load. The reference value of the load may be determined based on the EM criterion of the design rule and may be a predesignated value. When the calculated level of the load is about equal to or less than the reference value of a load, layout data (for example, D14 of FIG. 8) including a standard cell and a routing path connected to the standard cell may be generated in operation S25b.

When the calculated level of the load is greater than the reference value of a load, a routing wiring connecting the standard cell to a cell group may be changed in operation S27b. For example, the first routing wirings M2R1 and M3R1 and the second via V2, which connect the first standard cell C1 to the first cell group STC1 illustrated in FIG. 1A, may be changed to the first routing wirings M3R1 and M4R1, the second via V2, and the third via V3, which connect the first standard cell C1 to the first cell group STC1 illustrated in FIG. 4. Thus, the routing wiring may be changed to a routing wiring including a pattern of an upper wiring layer. For example, the wiring layer in which the routing wiring is disposed may be changed from a lower wiring layer to a relatively higher wiring layer.

In operation S29b, layout data D14 including a standard cell, a cell group connected to the standard cell, and a changed routing wiring may be generated. Therefore, in the method of manufacturing the integrated circuit according to an exemplary embodiment, an output load of an output pin of a standard cell, which is a driving cell, does not exceed the reference value.

Figure 13:
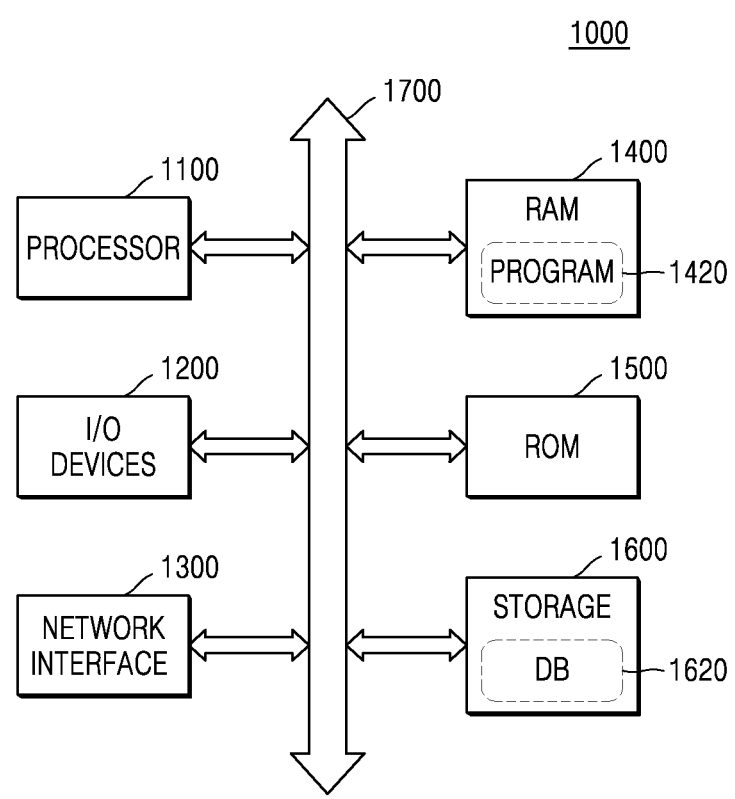
FIG. 13 is a block diagram illustrating a computing system including a memory storing a program, according to an exemplary embodiment.

FIG. 13 is a block diagram illustrating a computing system 1000 including a memory storing a program, according to an exemplary embodiment. At least some of the operations included in the method (for example, the method of FIGS. 8, 10, 11 and 12) of manufacturing the integrated circuit according to an exemplary embodiment may be performed by the computing system 1000.

The computing system 1000 may be a stationary computing system such as, for example, a desktop computer, a workstation, or a server, or may be a portable computing system such as, for example, a laptop computer. As illustrated in FIG. 13, the computing system 1000 may include a processor 1100, a plurality of input/output (I/O) devices 1200, a network interface 1300, random access memory (RAM) 1400, read-only memory (ROM) 1500, and a storage device 1600. The processor 1100, the plurality of input/output (I/O) devices 1200, the network interface 1300, the RAM 1400, the ROM 1500, and the storage device 1600 may be connected to a bus 1700 and may communicate with one another through the bus 1700.

The processor 1100 may be referred to as a processing unit, and for example, may include at least one core for executing an arbitrary instruction set (for example, Intel architecture-32 (IA-32), 64-bit extension IA-32, x86-64, PowerPC, Sparc, MIPS, ARM, IA-64, etc.) such as a microprocessor, an application processor (AP), a digital signal processor (DSP), and a graphics processing unit (GPU). For example, the processor 1100 may access a memory (e.g., the RAM 1400 or the ROM 1500) through the bus 1700 and may execute instructions stored in the RAM 1400 or the ROM 1500.

The RAM 1400 may store a program 1420 for manufacturing an integrated circuit according to an exemplary embodiment, or may store at least a portion of the program 1420. The program 1420 may allow the processor 1100 to perform at least some of operations included in a method (for example, the method of FIG. 8) of manufacturing the integrated circuit. That is, the program 1420 may include a plurality of instructions executable by the processor 1100, and the plurality of instructions included in the program 1420 may allow the processor 1100 to perform at least some of operations included in the flowchart described above with reference to FIG. 8.

The storage device 1600 may maintain data stored therein even when power supplied to the computing system 1000 is cut off. For example, the storage device 1600 may include a non-volatile memory device, or may include a storage medium such as magnetic tape, an optical disk, or a magnetic disk. Also, the storage device 1600 may be attached to or detached from the computing system 1000. The storage device 1600 may store the program 1420, as well as a standard cell library described above, according to an exemplary embodiment, and before the program 1420 is executed by the processor 1100, the program 1420 or at least a portion thereof may be loaded from the storage device 1600 to the RAM 1400. On the other hand, the storage device 1600 may store a file written in a program language, and the program 1420 generated from the file by a compiler or the like and at least a portion of the program 1420 may be loaded to the RAM 1400. Also, as illustrated in FIG. 13, the storage device 1600 may store a database (DB) 1620, and the DB 1620 may include information (for example, the standard cell library D12 of FIG. 8) needed for designing an integrated circuit.

The storage device 1600 may store data which is to be processed by the processor 1100 or data obtained through processing by the processor 1100. For example, the processor 1100 may process the data stored in the storage device 1600 to generate data based on the program 1420 and may store the generated data in the storage device 1600. For example, the storage device 1600 may store the RTL data D11, the netlist data D13, and/or the layout data D14 of FIG. 8.

The I/O devices 1200 may include an input device such as a keyboard or a pointing device, and may include an output device such as a display device or a printer. For example, a user may trigger execution of the program 1420 by using the processor 1100, input the RTL data D11 and/or the netlist data D13 of FIG. 8, and check the layout data D14 of FIG. 8, through the I/O devices 1200.

The network interface 1300 may provide access to a network outside the computing system 1000. For example, the network may include a plurality of computing systems and communication links, and the communication links may include wired links, optical links, wireless links, or arbitrary type links.

While the inventive concept has been particularly shown and described with reference to the exemplary embodiments thereof, it will be understood that various changes in form and detail may be made therein without departing from the spirit and scope of the inventive concept as defined by the following claims.

What is claimed is:

1. A method of manufacturing an integrated circuit, the method comprising:
    placing a driving cell based on netlist data comprising information about the integrated circuit with reference to a standard cell library,
    wherein the integrated circuit comprises the driving cell, and the driving cell comprises a first output pin and a second output pin configured to output a same output signal to a plurality of load cells;
    obtaining a level of a load allowable by each of the first output pin and the second output pin;
    grouping the load cells into a first cell group and a second cell group based on the allowable level of the load; and
    connecting the first output pin to an input pin of at least one load cell of the first cell group and connecting the second output pin to an input pin of at least one load cell of the second cell group.

2. The method of claim 1, further comprising:
    after connecting the first output pin to the input pin of the at least one load cell of the first cell group and connecting the second output pin to the input pin of the at least one load cell of the second group,
    calculating a level of a load of the first cell group and a level of a load of the second cell group;

when the calculated level of the load is greater than a reference value, changing the driving cell based on the standard cell library; and generating layout data comprising a changed driving cell, the first cell group, and the second cell group.

3. The method of claim 2, wherein the standard cell library comprises information about a first standard cell and a second standard cell each providing a same function as a function of the driving cell, the first standard cell comprises a first output pin and a second output pin spaced apart from each other by a first distance in a first direction, and the second standard cell comprises a first output pin and a second output pin spaced apart from each other by a second distance in the first direction, and changing the driving cell comprises changing the first standard cell to the second standard cell.

4. The method of claim 2, wherein the standard cell library comprises information about a first standard cell and a second standard cell each providing a same function as a function of the driving cell, the first standard cell comprises a plurality of first patterns provided in a first wiring layer and a first output pin and a second output pin each provided in a second wiring layer, wherein the first patterns and the first and second output pins have a ring shape in a layout view, the second standard cell comprises a plurality of first patterns provided in the first wiring layer, a second pattern provided in the second wiring layer, and a first output pin and a second output pin each provided in the second wiring layer, wherein the first patterns of the second standard cell, the second pattern, and the first and second output pins of the second standard cell have a mesh shape in a layout view, and changing the driving cell comprises changing the first standard cell to the second standard cell.

5. The method of claim 1, further comprising:

after connecting the first output pin to the input pin of the at least one load cell of the first cell group and connecting the second output pin to the input pin of the at least one load cell of the second group, calculating a level of a load of a first routing path comprising the first cell group and a first routing wiring connecting the first cell group to the first output pin;

calculating a level of a load of a second routing path comprising the second cell group and a second routing wiring connecting the second cell group to the second output pin;

when the calculated level of the load of the first routing path or the second routing path is greater than a reference value, changing at least one routing wiring of the first routing wiring and the second routing wiring; and generating layout data comprising the driving cell, the first cell group, the second cell group, and a changed routing wiring.

6. The method of claim 5, wherein changing the at least one routing wiring of the first routing wiring and the second routing wiring comprises changing the at least one routing wiring to comprise a pattern of an upper wiring layer.

7. The method of claim 1, wherein the standard cell library comprises information about a characteristic of a first output signal output from the first output pin and information about a characteristic of a second output signal output from the second output pin, and grouping the load cells is performed based on the characteristic of the first output signal and the characteristic of the second output signal.

8. A computing system for manufacturing an integrated circuit, the computing system comprising:

a memory configured to store a standard cell library comprising information about a plurality of standard cells and a program for designing the integrated circuit; and a processor configured to access the memory, wherein the processor is configured to, by executing the program:

place a driving cell comprising a first output pin and a second output pin, each outputting a same output signal provided to a plurality of load cells, with reference to the standard cell library;

group the load cells into a first cell group and a second cell group based on a level of a load allowable by each of the first output pin and the second output pin; and connect the first output pin to an input pin of at least one load cell of the first cell group, and connect the second output pin to an input pin of at least one load cell of the second cell group.

9. The computing system of claim 8, wherein the standard cell library comprises information about a first standard cell of the plurality of standard cells and a second standard cell of the plurality of standard cells, each providing a same function as a function of the driving cell, and the first standard cell comprises a first output pin and a second output pin spaced apart from each other by a first distance in a first direction, and the second standard cell comprises a first output pin and a second output pin spaced apart from each other by a second distance in the first direction.

10. The computing system of claim 8, wherein the standard cell library comprises information about a standard cell of the plurality of standard cells providing a same function as a function of the driving cell and comprising a first output pin and a second output pin each outputting the same output signal, the first output pin and the second output pin of the standard cell are patterns of a second wiring layer which is an upper layer with respect to a first wiring layer and are electrically connected to each other through first patterns provided in the first wiring layer, a second pattern provided in the second wiring layer, and first vias contacting the first patterns and contacting the first output pin of the standard cell, the second output pin of the standard cell, and the second pattern, and in a layout view, the first patterns, the second pattern, the first output pin of the standard cell, and the second output pin of the standard cell have a mesh shape.

11. The computing system of claim 8, wherein the standard cell library comprises information about a standard cell of the plurality of standard cells providing a same function as a function of the driving cell and comprising first to third output pins outputting the same output signal.

12. The computing system of claim 8, wherein the standard cell library comprises information about a standard cell of the plurality of standard cells providing a same function as a function of the driving cell, and the standard cell comprises a first inverter and a second inverter each receiving one signal, a first output pin connected to an output terminal of the first inverter, and a second output pin connected to an output terminal of the second inverter.

\* \* \* \* \*